March 29, 1966 A. MAGG ETAL 3,242,759
SHIFTING ARRANGEMENT FOR CHANGE SPEED GEARS OF MOTOR VEHICLES
Filed June 23, 1964 4 Sheets-Sheet 1
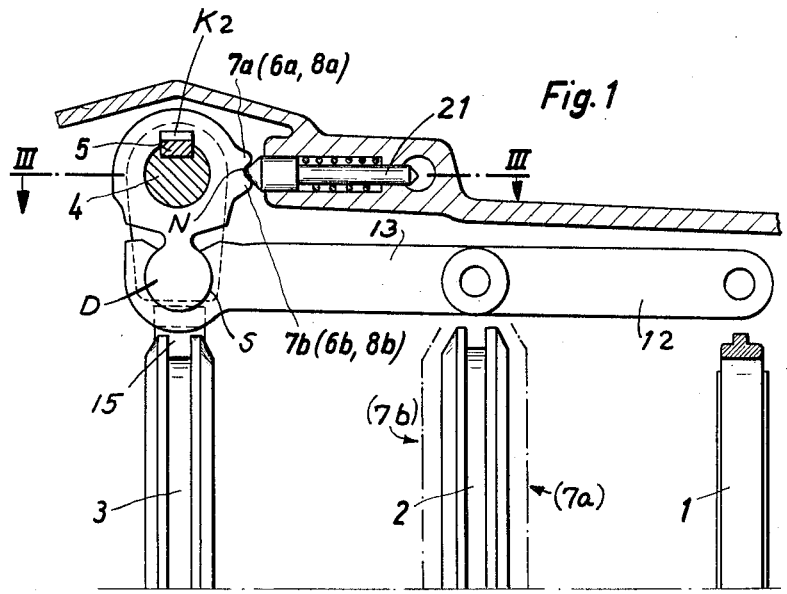
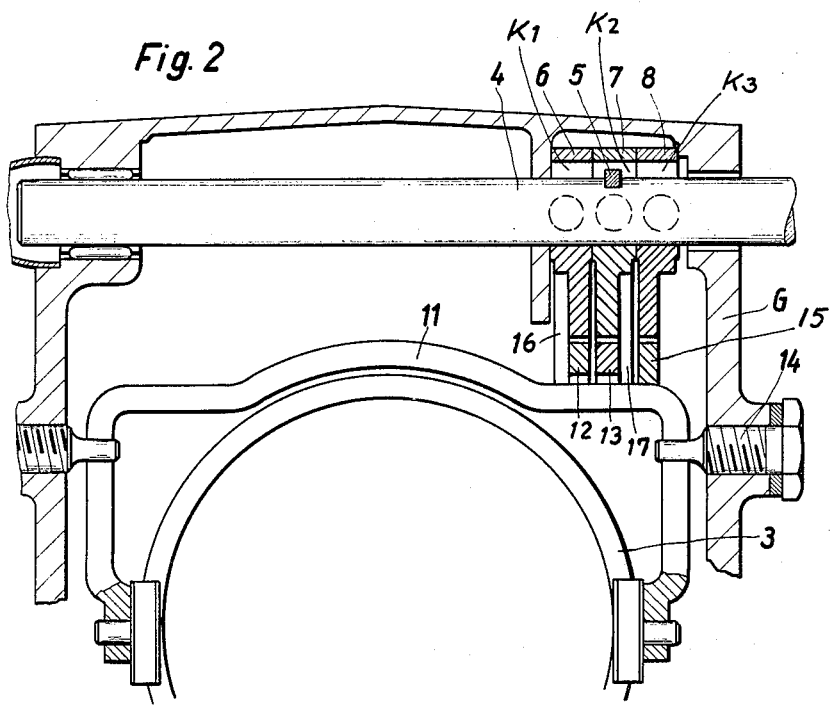
Inventors
ALFRED MAGG
HEINZ HAESSLE
by: Albert M Zalkind

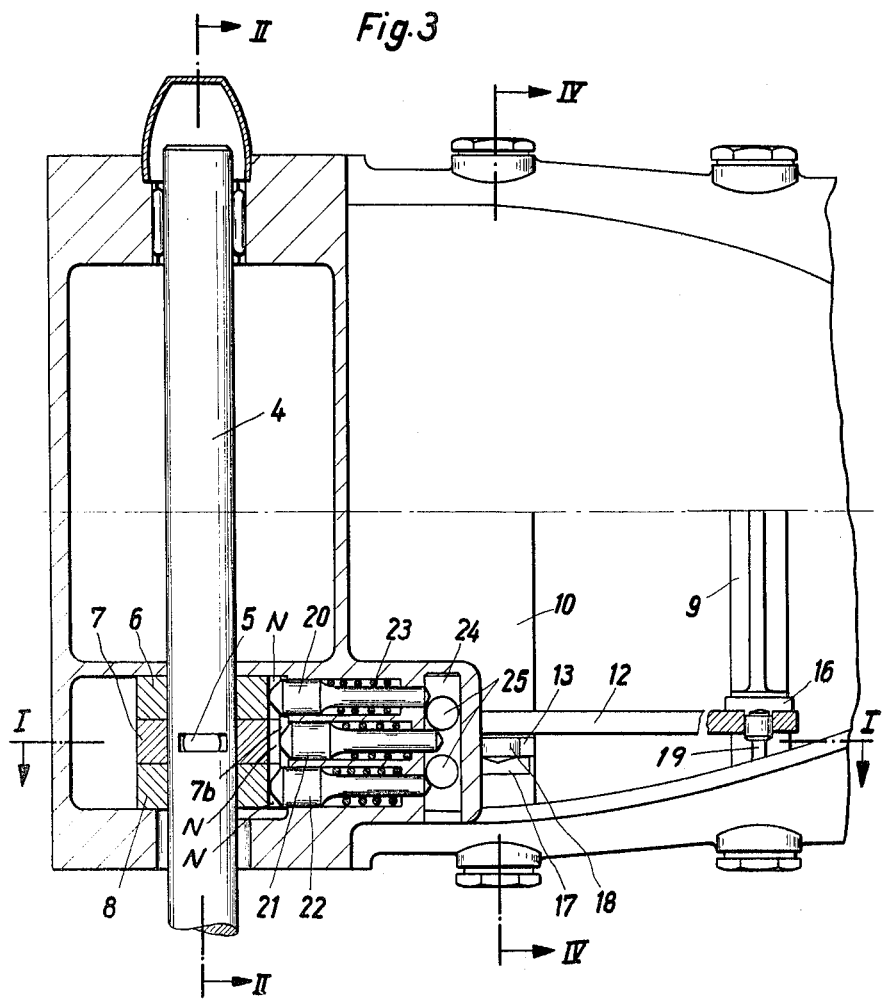

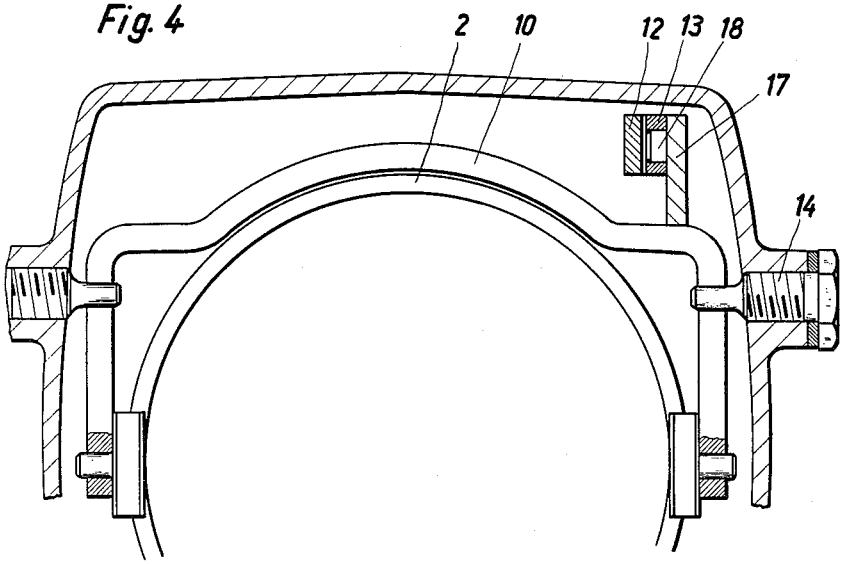

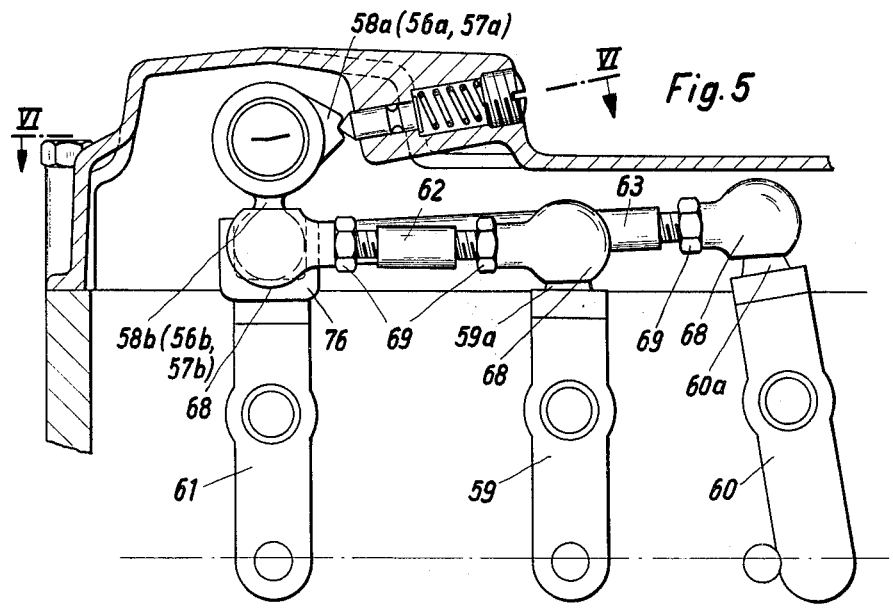
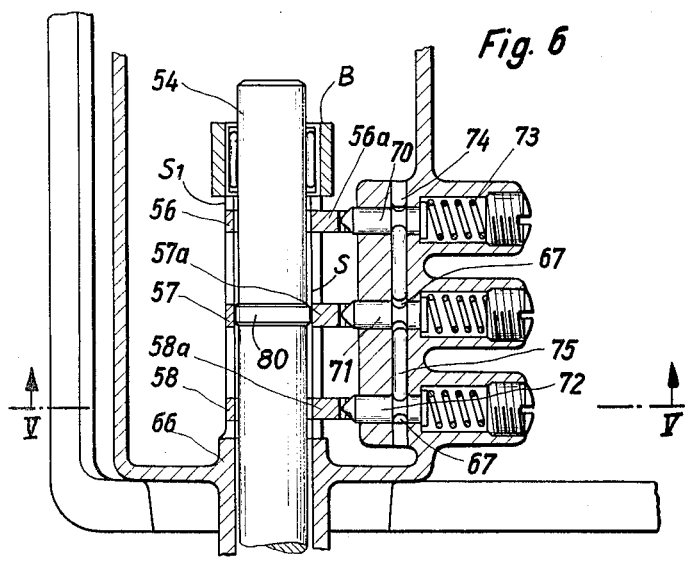

United States Patent Office 3,242,759
Patented Mar. 29, 1966

3,242,759
SHIFTING ARRANGEMENT FOR CHANGE SPEED GEARS OF MOTOR VEHICLES
Alfred Magg and Heinz Haessle, Friedrichshafen, Germany, assignors to Zahnradfabrik Friedrichshafen Aktiengesellschaft, Friedrichshafen, Germany
Filed June 23, 1964, Ser. No. 377,346
Claims priority, application Germany, June 28, 1963, Z 10,199
11 Claims. (Cl. 74—477)

This invention relates to shifting mechanisms for change speed gears for motor vehicles and more particularly to shifting sleeve mechanisms operated by pivoted yokes or forks.

Prior art shifting gear mechanisms employ manual shifting forks or conventional gate type mechanisms and the like for shifting gears, which require considerable manual effort on the part of a driver and is accompanied by an abrupt change of speed, roughness and noise, such as the clanging of gears and the like. Prior change gear mechanisms also tend to slow down traffic due to vehicle slowing and are uneconomical in consumption of gas in city travel where traffic lights cause considerable stopping and starting.

The conventional gate type of gear shifting mechanisms have high operating forces because of the great frictional losses in the transfer elements, especially, the bearing forces of the shift rods in the bearing bores, which rods are subject to the off-center contact of the coupling pieces and shifting forks which cause great frictional forces therein. The difficulty of manual operation of conventional gear shifting arrangements has a tiring effect on the driver, especially, in driving heavy commercial vehicles on roads which require a frequent change of speeds.

The present invention seeks to overcome the advantages of the prior art and has among its objects the provision of novel shifting sleeve means held in a pivoted yoke means for change speed gears operated by an improved manual shifting linkage and detent means therefor.

Another object of the invention is to provide a novel shifting arrangement in a change speed gear mechanism which is easier to handle and operate.

A further object of the invention is to provide rotatable shifting levers on a gear shift lever shaft arranged perpendicularly in relation to the gear shafts and adapted to be slidably and rotatably positioned in the gear housing.

Another object of the invention is to provide a novel coupling for a gear shift to a selected gear shifting lever means interconnected by linkage means to a shifting gear sleeve means.

Still other objects and purposes of the invention reside in the combination of elements, arrangements of parts, and features of construction, all as will be more fully pointed out hereinafter and disclosed in the accompanying drawings wherein there are shown two embodiments of the inventive concept.

Briefly, the invention comprises a gear housing, a manually operated gear shift shaft therein having a plurality of selectively rotatable gear shift levers or fingers which actuate shift rods and which also actuate respective detent pin members carried in the housing which in turn actuate locking elements such that only one finger can effect gear engagement at any one time. The shift fingers comprise collars having cam surfaces for movement of and detent engagement with the detent members.

The collars have internal grooves into which may be slid a coupling key carried by the shaft for selection of a finger to be rotatively actuated to effect a desired transfer of speed change gears.

When the shaft is actuated manually to selectively actuate a gear shift rod, the locking elements engage and lock all the pins and their corresponding gear shift levers from operation except the unlocked pin coacting with the shift lever to be operated which allows this lever to operate through linkage means connected to a pivoted yoke to operate a gear shifting sleeve which makes a desired change of gears in the transmission of the motor vehicle.

In the drawings:
FIGURE 1 shows a construction in longitudinal section through the gear housing taken obliquely to the gear shift lever shaft, on line I—I in FIGURE 3;
FIGURE 2 shows a cross section through the gear housing parallel to the gear shift lever shaft taken on line II—II in FIGURE 3;
FIGURE 3 shows a horizontal section of the gear shift lever shaft taken substantially on line III—III in FIGURE 1;
FIGURE 4 shows a cross section through the gear housing taken on line IV—IV in FIGURE 3;
FIGURE 5 shows a second embodiment of the invention as a longitudinal section taken on line V—V in FIGURE 6; and
FIGURE 6 shows a horizontal sectional view taken on line VI—VI in FIGURE 5.

In the drawings like reference numerals represent like parts.

FIGURES 1 to 4 show a shifting arrangement for the first embodiment of the invention for a transmission with five forward speeds and one reverse speed. To accomplish the shifting of the speeds, three shift sleeves 1, 2 and 3 are provided which will be understood to effect engagement of associated gears (not shown) in a conventional manner. Shift sleeve 1 has been provided for the first forward speed and reverse speed. Shift sleeve 2 has been provided for the second and third speeds, and shift sleeve 3 is provided for the fourth and fifth speeds.

Gear shift lever shaft 4 is longitudinally slidably reciprocal and also rotatable by means of an operating lever (not shown). A key or coupling element 5 is fixedly carried on the shaft 4 to selectively engage the collars of gear shift fingers 6, 7 and 8 carried on the shaft 4 and being freely rotatable but non-slidable thereon. Any collar can be keyed via key 5 to shaft 4, selectively.

Each of the collars has on its outer surface detent cam formations to be later described (FIG. 1) which maintain alignment of keyways $K_1$, $K_2$, and $K_3$, in idling position to thus permit reciprocal movement of shaft 4 (FIG. 2), whereby key 5 can move into any keyway of a shift finger for speed selection.

The construction utilizes shift yokes 9, 10 and 11 mounted so as to be freely rotatable about pivot bearings, such as 14, in the gear housing G, as shown in FIGS. 2 and 4. The yoke 11 is directly connected with the finger 8 located immediately above it by means of extension 15, as shown in FIG. 2, and has no shift rod, such as yokes 9 and 10, FIGS. 2 and 3.

Yoke 9 his a finger 16 provided with a roller ended stub shaft 19 (FIG. 3) which is received in a bore in shift rod 12. Yoke 10 (FIG. 4) has a finger 17 carrying a roller ended stub shaft 18 received in a bore of shift rod 13.

It will be noted that shaft 18 points to the exterior of casing G, while shaft 19 points in the opposite direction, which effects compactness of mechanism.

The reciprocating of the shift rods effect in a conventional manner a swinging of respective yokes which reciprocate respective sleeves to engage various gears for desired speeds, all as heretofore known.

In the embodiment shown in FIGS. 1 to 4, the fingers 6, 7 and 8 may be made of stamped sheet metal with disc-like portions D which are received in the stamped shift rod sockets S (FIG. 1) for economical production. Likewise, the rods 12 and 13 may be of stamped sheet metal.

Fingers 6, 7 and 8 (FIG. 1) have respective spaced cams 6a, 6b; 7a, 7b; 8a, 8b. Between each pair of lobes is a detent notch such as N. The notches are engaged by the conical ends of spring pressed detent pins 20, 21 and 22 (FIG. 3), which hold all fingers yieldably against rotation so that all sleeves are in idling or neutral position for the transmission. At this time all grooves $K_1$, $K_2$ and $K_3$ are maintained aligned so that shaft 4 can be manually reciprocated to select a speed by moving key 5 into the groove of a particular finger. After such selection of fingers 6, 7 or 8 the shaft 4 is rotated, key 5 rotating the finger, thus actuating a respective rod, yoke and sleeve, it being understood that yoke 11 has no rod but is directly connected by finger 15 to finger 8.

Referring now to detent pins 20, 21 and 22, they are arranged substantially perpendicularly in relation to the shaft 4, as shown in FIG. 3, and are shiftable in substantially the same plane with the shaft 4 axis, being slidable in bores in the housing G.

Respective compression springs 23 are arranged to hold the detent pins 20, 21 and 22 in the notches N of the fingers 6, 7 and 8. Thus, each pin has a conical cam follower end which can ride over the cams 6a or 6b, 7a or 7b, or 8a and 8b, as shown in FIG. 1, and move into the detent notches between the cams of the respective finger. The other ends of the locking pins 20, 21 and 22 are also cone-shaped and protrude into a housing bore 24, perpendicular to the pin axes, which contains (FIG. 3) locking ball elements 25.

Locking balls 25 are movable in bore 24 and have diameters such that only one pin 20, 21 or 22, can move into bore 25 at any one time. Thus, when shaft 4 is in an idling position, the locking balls 25 will have the most freedom of movement relative to the ends of the bore 24. If one of the detent pins, for example 21, is shifted to the position shown in FIG. 3, then one of the locking balls 25 is held non-shiftable between the cone-shaped ends of the pins 20 and 21 while the other locking ball is likewise retained between the locking pins 21 and 22. Accordingly, neither pin 20 nor 22 can be shifted, thus eliminating any possibility of erroneous gear change either due to fault of the operator or mechanical fault.

In summation of the operation of the embodiment of FIGURES 1 through 4, the shaft 4 is coupled to a manual shift lever (not shown) in such manner that shaft 4 moves longitudinally to move key 5 to a selected groove $K_1$, $K_2$, $K_3$ and then rotated so that a respective finger effects reciprocal movement of a respective shift rod to actuate the pertinent shift sleeve for a desired speed. For example, if finger 7 is to be actuated depending on direction of rotation, the cam 7a or 7b engages pin 21 to push it out of respective notch N against its spring 23, the outer end of the pin displacing locking balls 25 in bore 24, as shown in FIG. 3. Locking balls 25 then block the ends of pins 20 and 22 from being operated while allowing rotation of finger 7 to actuate yoke 10 to obtain a change of speed for a motor vehicle.

Fingers 6 and 8 operate in a similar manner to effect speed selection, and any finger can be rotated either clockwise (FIG. 1) or counterclockwise to shift a sleeve right or left for effecting either of two speeds in accordance with known transmission constructions.

Thus, the cams coact with respective detent pins depending on direction of rotation of a respective finger, the high point of any cam directly abutting the conical tip of a respective detent pin to push such pin to a position as shown in FIG. 3 where cam 7b engages pin 21, thus locking shaft 4 against movement rotationally until finger 7 is brought back to neutral position with its groove $K_2$ once more aligned with grooves $K_1$ and $K_3$. Of course, when a finger 6, 7 or 8 has been rotated thus misaligning the grooves, key 5 is locked in the groove of that finger and therefore shaft 4 is held against substantial reciprocal movement pending re-establishment of neutral condition of the transmission by aligning the grooves, i.e., by return movement of that finger.

Referring to FIGS. 1 and 3, the phantom line positions of sleeve 2 illustrates the effect of cams 7a and 7b in moving the sleeve, the yokes being omitted for clarity.

In the form of the invention shown in FIGS. 5 and 6, a shaft 54 is supported for reciprocation and rotation in the housing 66, as shown, and will be understood to be manually operated by a gear shift lever, not shown. The shaft carries collars 56, 57, and 58 having respective cam portions 56a, 57a, and 58a extending radially therefrom and having detent notches, as shown, engaging the conical tips of pins 70, 71, and 72, which are spring-biased as by respective springs 73 so that they hold the collars in alignment. The collars are integral with fingers such as 56b, 57b, and 58b, respectively, which are spherically ended so as to effect ball joints, 68, in each instance, which are secured to rockable levers 59, 60, and 61 by means of ball joints 68. Thus, the rockable lever 61 is directly connected via a ball joint socket to the ball end of finger 58b. However, the rockable lever 59 is connected via an adjustable, threaded device comprising the threaded sleeve 62 and the nuts 69, to the finger 57. Finally, the rockable lever 60 is connected via an adjustable rod comprising similar elements 63 and 69, as just described, to the finger 56.

From the above description it will be apparent that all connections between the finger and the rockable levers are effected through ball joints and that in the instance of the levers 59 and 60 adjustment of the rod connections as to length may be made. Thus, sleeves 62 and 63 effect length adjustment and the nut 69 is a lock nut to preserve the adjusted lengths for each rod. In the instance of the rod ends, they may be attached to the respective ball housings as by being threaded therein.

The rockable lever 61 may be provided with a yoke 76 to take the ball end of finger 58b.

The rocking levers 59, 60, and 61 will be understood to be suitably coupled to sleeves such as 1, 2, and 3 of FIG. 1 for effecting gear shifting.

The ball ends of the fingers may be attached thereto as by threading.

The collars 56, 57, and 58 may be spaced as by sleeves such as S and further spaced with respect to the housing bearing B by collars such as S'. A key such as 80 is carried by shaft 54 for co-action with grooves (not shown) in the collars, as hereinabove described in connection with the form of the invention shown in FIGS. 1 through 4.

The detent pins 70, 71, and 72 are resiliently biased in an adjustable manner, by means of the end screws shown, which abut the respective springs 73 that press the pins. Such pins, as in the preceding embodiment, are axially parallel and in planar arrangement and pass through a transverse chamber 74 which is the equivalent of the transverse chamber 24 shown in FIG. 3.

In this instance, however, the chamber 74 retains slidable locking elements such as pins 75, having sloped ends which co-act with peripheral cam-like grooves 67 of the detent pins 70, 71, and 72. The length of the locking pins is such as to be about equal to the groove depth plus the distance between the bores that hold the detent pins, and are longer, in any event, than the surface-to-surface distance between the detent pins. It will, accordingly, be apparent that, when shaft 54 is reciprocated to select a particular finger for rotation by the key 80, and subsequently rotated to rotate that finger for engaging the gear selected thereby, the respective detent pin will be pushed against its spring and will cam a locking pin 75 toward an adjacent detent pin to lock that adjacent pin. Thus, as detent pin 70 is pushed to the right it will cam the locking pin which engages it downwardly, to lock detent pin 71 by going into the groove 67 of that pin. A similar action occurs if detent pin 72 is pushed to the right. Thus, if either of the end detent pins, as viewed on FIG. 6, is actuated, it will lock the center detent pin. However, if the center detent pin 71 is actuated it will lock both of the end pins 70 and 72.

Although in the embodiment just described only the center pin can lock both of the other pins, such construction is intended for small vehicles where a shifting error is not as serious as it would be for larger vehicles for which the ball locking mechanism described in the first embodiment of this invention is intended.

The embodiment just described may be economically manufactured through the use of stamped parts or forged parts.

Having thus described the invention, we are aware that various changes may be made without departing from the spirit thereof and, accordingly, we do not seek to be limited to the precise illustration herein given except as set forth in the appended claims.

We claim:

1. A gear shifting mechanism comprising a housing having a slidable and rotative shaft carried thereby, a plurality of fingers carried rotatively on said shaft and means for preventing axial movement of said fingers, said fingers having bores through which said shaft passes and said bores having grooves open to said shaft, a key carried by said shaft and movable upon reciprocation thereof into a selected groove whereby the respective finger may be rotated upon rotation of said shaft, said fingers having respective detent elements rotative therewith, a plurality of respective coacting detent elements carried by said housing, and movable by rotation of respective fingers and normally maintaining said fingers in a position whereat said grooves are aligned for passage therethrough of said key to select a finger to be rotated, wherein rotation by said key of a selected finger causes movement of the respective coacting detent element while the remaining coacting detent elements remain stationary, movable locking elements disposed intermediate said coacting detent elements, whereby movement of any coacting detent element effects movement of said locking elements to lock said other coacting detent elements against movement so as to prevent rotation of the respective fingers thereof.

2. In a device as set forth in claim 1, said fingers comprising collars surrounding said shaft and said detent elements comprising radial cam portions of said collars resiliently engageable with said coacting detent elements.

3. In a device as set forth in claim 2, said coacting detent elements comprising respective pins slidably engageable with said cam portions and respective springs biasing said pins for said engagement.

4. In a device as set forth in claim 3, said cam portions of each collar comprising a pair of angularly spaced cams and a detent notch therebetween, said pins being engageable in respective detent notches.

5. In a device as set forth in claim 3, said pins having portions movable in a chamber of said housing, said locking elements being retained in said chamber and shiftable transversely of said pins by movement thereof to engage and lock an adjacent pin.

6. In a device as set forth in claim 5, said locking means comprising balls, said chamber being elongated transversely of said pins and having ends spaced from the end pin on each side of the end pin of a planar row of parallel pins, said spacing being less than any ball diameter, the spacing between pins being less than any ball diameter, the dimension of said chamber in the direction of the axes of said pins from the end of any pin being less than any ball diameter.

7. In a device as set forth in claim 5, said portions having peripheral grooves, said locking elements being slidable in said chamber and being movable by axial motion of one of two adjacent pins to shift into the groove of the other of said adjacent pins to lock that pin, and wherein a pin disposed between two pins effects locking of both thereof upon being moved, said locking elements being of a length greater than the spacing of two adjacent pins between their outer surfaces and having sloping ends so as to have a cam coaction with side walls of said grooves whereby said locking elements are shifted by pin movement out of the groove of one pin and into the groove of an adjacent pin.

8. A mechanism as set forth in claim 1, including connecting rods articulated to said fingers and extending for connection to gear engaging sleeves and means for connecting certain of said fingers to said rods comprising disclike members carried by said fingers and being received in circular apertures of said rods, and wherein said rods are made of sheet metal.

9. In a mechanism as set forth in claim 8, including means for connecting said rods to shifting yokes for effecting movement of gear engaging sleeves comprising stub shafts extending into bores of certain of said rods, said shafts being carried by fingers secured to respective yokes, there being two such stub shafts extending in opposite directions transversely of the axis of said sleeves.

10. In a mechanism as set forth in claim 1, certain of said fingers being connected to shift rods through ball joints at an end of respective rods and the other ends of said rods being connected through ball joints to rockable levers for effecting actuation of gear engaging sleeves.

11. In a mechanism as set forth in claim 10, wherein said rods comprise threaded members for effecting length adjustment.

References Cited by the Examiner

UNITED STATES PATENTS 2,922,315  1/1960  Primeau _____ 74—473
2,995,951  8/1961  Evans _____ 74—477 X MILTON KAUFMAN, *Primary Examiner.*